United States Patent
Kozup et al.

(10) Patent No.: US 12,012,557 B2
(45) Date of Patent: Jun. 18, 2024

(54) START-UP METHOD FOR CONTACTING A FEED STREAM WITH FLUIDIZED CATALYST

(71) Applicant: UOP LLC, Des Plaines, IL (US)

(72) Inventors: Steven C. Kozup, Chicago, IL (US); Michael R. Van de Cotte, Palatine, IL (US); Adam J Kanyuh, Streamwood, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/970,547

(22) Filed: Oct. 20, 2022

(65) Prior Publication Data
US 2023/0203385 A1    Jun. 29, 2023

Related U.S. Application Data

(60) Provisional application No. 63/294,330, filed on Dec. 28, 2021.

(51) Int. Cl.
     *B01J 8/18*      (2006.01)
     *C10G 11/18*      (2006.01)

(52) U.S. Cl.
     CPC .......... *C10G 11/187* (2013.01); *B01J 8/1809* (2013.01); *B01J 2208/00646* (2013.01);
(Continued)

(58) Field of Classification Search
     CPC .......... C10G 11/187; C10G 2300/4031; C10G 2400/20; C10G 2400/22; B01J 8/1809; B01J 2208/00646
See application file for complete search history.

(56) References Cited

U.S. PATENT DOCUMENTS

| | | | |
|---|---|---|---|
| 4,825,380 A * | 4/1989 | Hobbs | F04D 27/0207 700/282 |
| 7,678,956 B2 | 3/2010 | Heinritz-Adrian | |

(Continued)

FOREIGN PATENT DOCUMENTS

| WO | 2001051589 A1 | 7/2001 |
|---|---|---|
| WO | 2020060700 A1 | 3/2020 |

OTHER PUBLICATIONS

Bhasin et al. ("Dehydrogenation and oxydehydrogenation of paraffins to olefins." Applied Catalysis A: General 221.1-2 (2001): 397-419) (Year: 2001).*

(Continued)

*Primary Examiner* — In Suk C Bullock
*Assistant Examiner* — Jason Y Chong
(74) *Attorney, Agent, or Firm* — Paschall & Associates, LLC; James C. Paschall

(57) ABSTRACT

A start-up method for contacting a feed stream with fluidized catalyst is disclosed. The start-up method comprises reacting a feed stream over a catalyst to produce a gas stream and spent catalyst. The gas stream is separated from the spent catalyst. The separated gas stream is passed to a compressor. The operating condition associated with the compressor is measured. Based on the measured operating condition associated with the compressor, one or both of a supplemental hydrocarbon stream and a supplemental hydrogen gas stream is provided to the compressor to meet a predetermined operating condition associated with the compressor.

17 Claims, 8 Drawing Sheets

(52) U.S. Cl.
CPC .. *C10G 2300/4031* (2013.01); *C10G 2400/20* (2013.01); *C10G 2400/22* (2013.01)

(56) References Cited

U.S. PATENT DOCUMENTS

| | | | |
|---|---|---|---|
| 8,624,074 | B2 | 1/2014 | Towler |
| 10,662,132 | B2 | 5/2020 | Jo et al. |
| 10,752,845 | B2 * | 8/2020 | Van de Cotte .......... C07C 5/321 |
| 11,254,627 | B2 | 2/2022 | Nyce et al. |
| 11,505,515 | B2 | 11/2022 | Fritz |
| 2006/0073013 | A1 | 4/2006 | Emigholz et al. |
| 2013/0252801 | A1 * | 9/2013 | Leonard .................. B01J 38/10 |
| | | | 502/53 |
| 2017/0152447 | A1 | 6/2017 | Housmans et al. |
| 2020/0115301 | A1 | 4/2020 | Roman et al. |

OTHER PUBLICATIONS

Search Report and Written Opinion for PCT/US2022/082227 dated May 1, 2023.
Shan Qibin, "Effect of Hydrogen on the Performance of Propane Dehydrogenation over Pl/Al2O3 with Different Particle Sizes", East China University of Science and Technology, Dec. 20, 2019.

\* cited by examiner

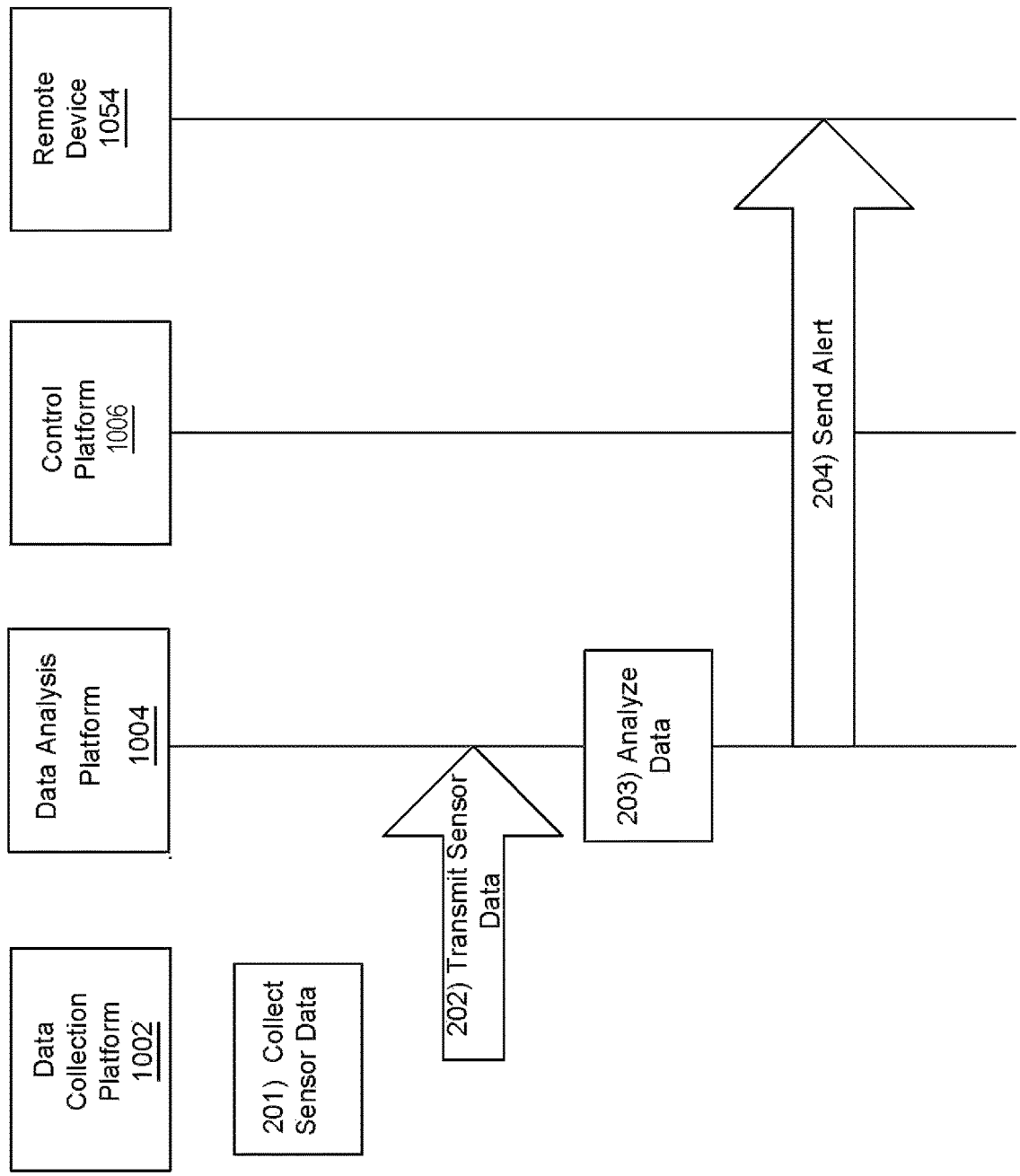

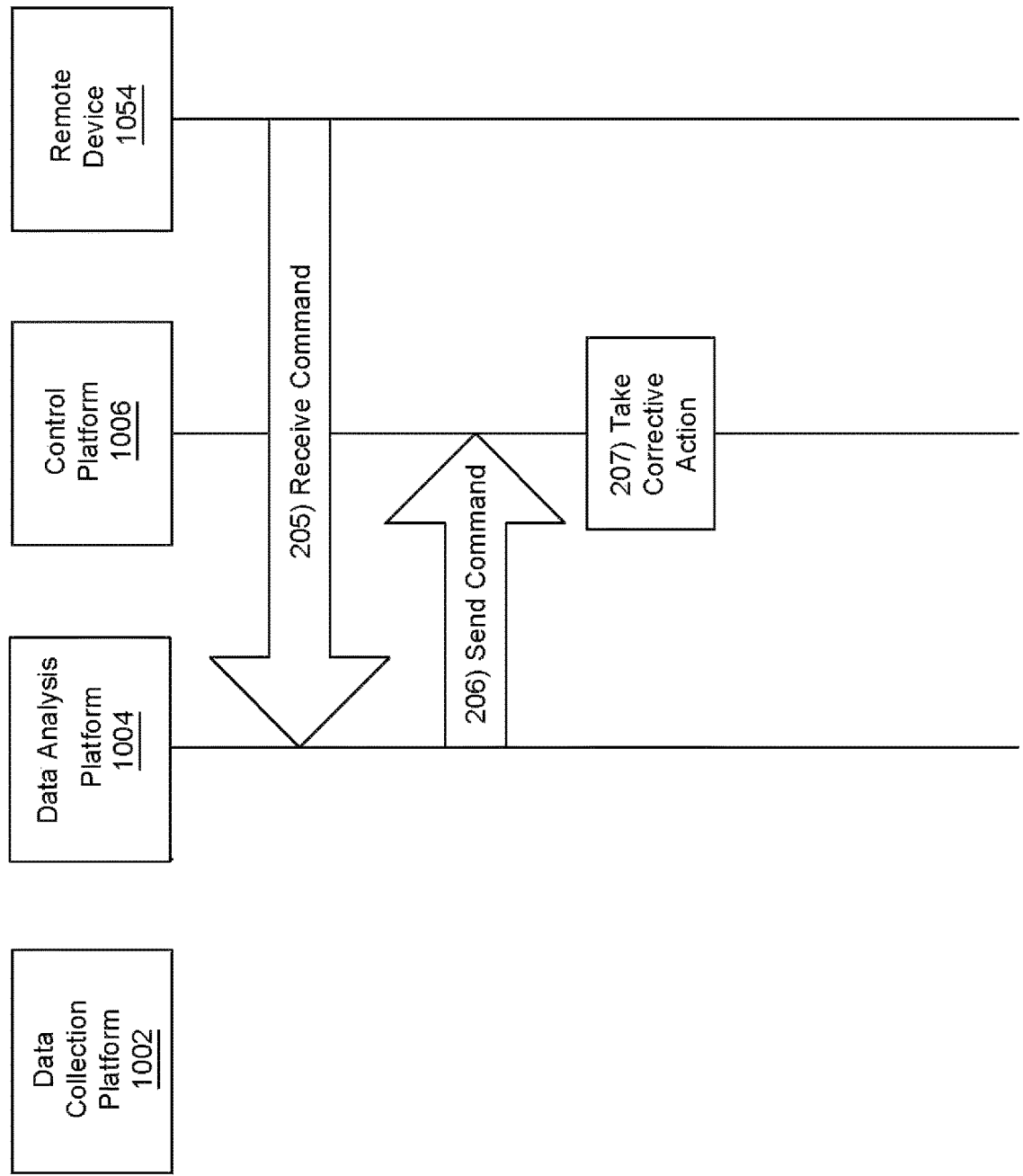

START-UP METHOD FOR CONTACTING A FEED STREAM WITH FLUIDIZED CATALYST

CROSS-REFERENCE TO RELATED APPLICATIONS

This application claims priority from U.S. Provisional Application No. 63/294,330, filed Dec. 28, 2021, which is incorporated herein in its entirety.

FIELD

The field is the reaction of feed with fluid catalyst. The field may particularly relate to a start-up method for contacting a feed stream with fluidized catalyst.

BACKGROUND

Light olefin production is vital to the production of sufficient plastics to meet worldwide demand. Paraffin dehydrogenation (PDH) is a process in which light paraffins such as ethane and propane can be dehydrogenated to make ethylene and propylene, respectively. Dehydrogenation is an endothermic reaction which requires external heat to drive the reaction to completion.

In PDH reactions with fluidized catalyst, coke can deposit on the catalyst while catalyzing the reaction. The catalyst may be regenerated in a catalyst regenerator by combusting coke from the catalyst in the presence of oxygen. In some cases, addition fuel may be combusted in the regenerator to increase the temperature of the regenerated catalyst. The hot regenerated catalyst may then be transferred back to the reactor to catalyze the reaction.

Dehydrogenation of paraffins also improves at lower pressures due to the generation of hydrogen in the dehydrogenation reaction. Consequently, it is common for compression to occur at the reactor outlet as opposed to the inlet. During reactor turndown or during startup of a PDH process, the feed composition can roughly approximate the reactor effluent composition that requires compression. This high average molecular weight gas can represent a large departure from the compressor's normal operating range which would be a lighter average molecular weight due to the presence of product hydrogen. Supplying a compressor with expanded operating window can increase capital cost for the compressor and the driver. Furthermore, employing a dynamic compressor rated for a much heavier gas expected during plant start-up or unit turndown is simply not suitable aerodynamically for normal operation. A product compressor rated for gas composition for normal plant operation may surge internally due to over-compression when operating on a heavier gas as may be encountered during plant start-up or unit turndown. Surge causes disruption to the material flowing through the product compressor through high frequency flow reversals resulting causes in serious equipment damage. The likelihood of this occurrence further increases when the product compressor driver type is a fixed speed electric motor. Refiners value fixed speed electric motors as they represent the minimum capital investment solution.

In a multi-stage, dynamic compressor, surge can occur during start-up when either the total flow through the machine, or the flow to an individual stage (impeller or blade row) is below the associated surge limit flow rate. In a centrifugal or axial compressor, this phenomenon typically occurs within the final diffuser before the outlet. When this occurs, the increased outlet pressure drives gas flow temporarily backward toward the impeller or impellers. Surge typically happens in an oscillatory manner and is often accompanied by rapid (even exponential) temperature increase. Various factors can cause surging, such as increased discharge pressure, improper valve cycling, change in gas composition (e.g., decreased molecular weight of the gas), ramping the feed rate too fast, improper limit stop set point on the valves, and other operational errors or malfunctions, among other factors. Surge can decrease the effectiveness and efficiency of the compressor, and the vibrations, thrust reversals, and temperature increases that result from surging can damage components of the compressor (sometimes quickly) and reduce the functional life of the compressor. Each dynamic compressor has a surge limit that represents a limit on operation of the compressor. During the start-up or turndown, the prevailing operating condition can be very close to the limit of operation of the compressor.

There is a need, therefore, for improved processes and apparatuses for dehydrogenation of paraffins to efficiently maintain gas composition within allowable limits to the compressor during the start-up and turn down periods.

BRIEF SUMMARY

The present disclosure provides a method for dehydrogenation of a paraffin feed in a PDH process during a period of low conversion. The current method utilizes a product compressor during start-up and turn down for a fluidized paraffin dehydrogenation reactor. The method provides a more stable and consistent gas composition to the product compressor which increases reliability of the product compressor and the downstream separation system. The method can reduce capital expenditure for a product compressor.

BRIEF DESCRIPTION OF THE DRAWINGS

FIGS. 7A-7B depict an illustrative flow diagram of one or more steps that one more devices may perform in controlling one or more aspects of the operation of the compressor in the PDH process during start-up in accordance with one or more example embodiments;

DEFINITIONS

Figure 1:
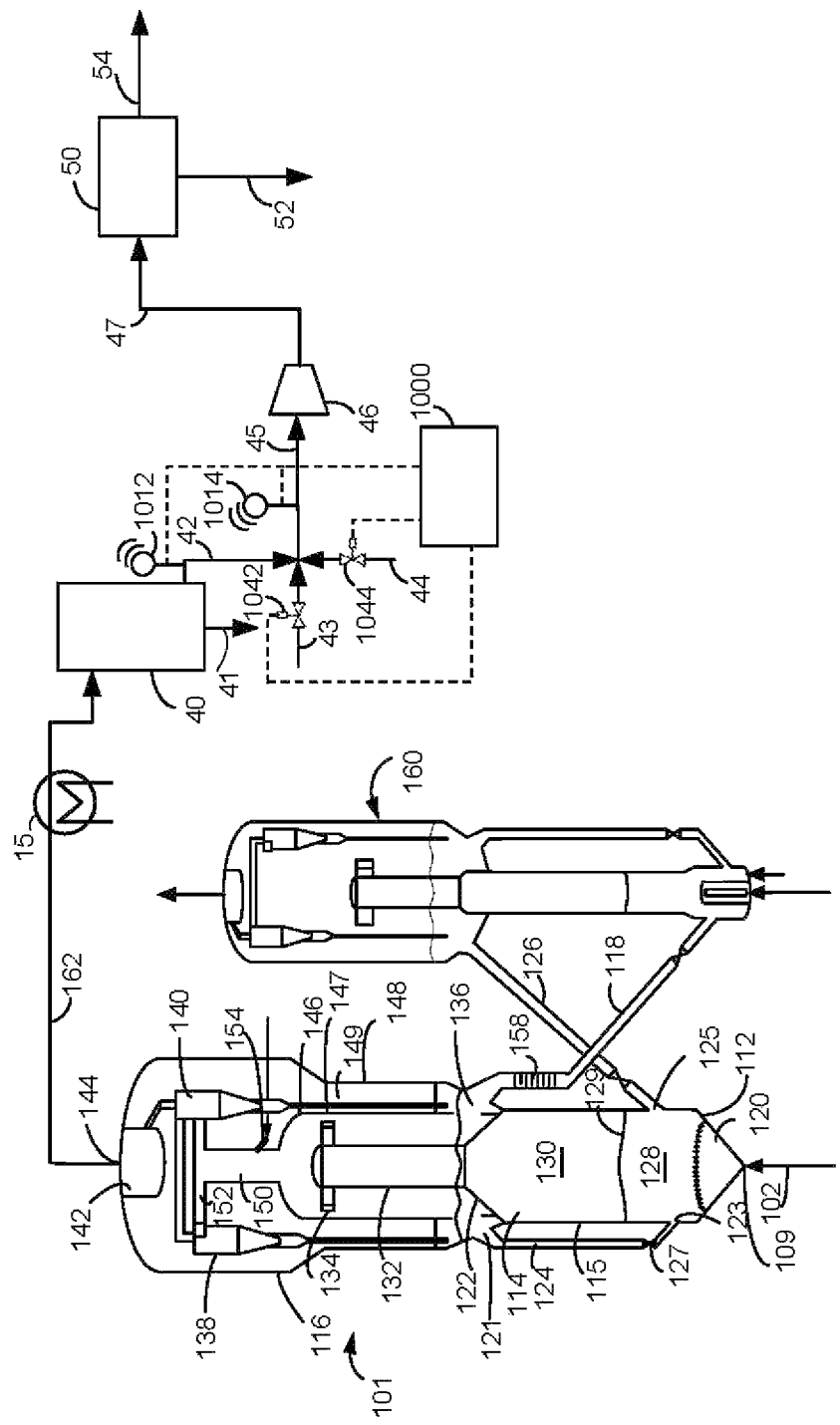
FIG. 1 is a schematic drawing of a process and apparatus of the present disclosure.

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "predominant" or "predominate" means greater than 50%, suitably greater than 75% and preferably greater than 90%.

The term "fuel gas" comprises hydrocarbons, hydrogen and mixtures thereof.

The term "Cx" is to be understood to refer to molecules having the number of carbon atoms represented by the subscript "x". Similarly, the term "Cx-" refers to molecules that contain less than or equal to x and preferably x and less carbon atoms. The term "Cx+" refers to molecules with more than or equal to x and preferably x and more carbon atoms.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

DETAILED DESCRIPTION

The present disclosure provides a start-up method envisaged to adjust one of the parameters of a product gas obtained from dehydrogenation of a paraffin feed to reduce the operating range requirements for a compressor, generally called a product compressor. The start-up method ensures that the gas composition fed to the product compressor remains consistent during the start-up or turn down period to prevent any sudden shift towards a surge in the product compressor. Usually, the product gas to the product compressor comprises hydrocarbons and hydrogen. The start-up method envisages that the ratio of the hydrocarbons and hydrogen in the product gas to a suction side of the product compressor remains consistent during the start-up compared to a normal operating condition for the product compressor.

In order to start-up the PDH reactor section, the unit is inventoried with propane and hydrogen to low pressure and there is no charge to the unit. The product compressor is started. The system volume on the discharge side of the compressor must be pressurized to discharge pressure. For a closed system this results in the suction side pressure dropping. To reestablish the desired suction pressure and maintain the correct product gas compressor gas composition, a supplemental hydrocarbon stream and/or supplemental hydrogen gas stream lines are opened to add mass to the system in the correct proportion. Doing this incorrectly (wrong order/wrong blend, etc.), can result in a costly start-up delay of the unit. When the correct conditions are established in the unit, then feed is slowly charged to the unit and the product gas composition drifts away from the initial starting target value due to the generation of product by the dehydrogenation reaction. Through measurement of the product gas composition and proper data collection the flow rates of the supplemental hydrocarbon stream supply line and supplemental hydrogen gas stream supply line can be controlled to compensate for the dehydrogenation reaction and keep the product compressor in the desired design operating envelope.

The current method discloses providing a supplemental hydrocarbon stream and/or a supplemental hydrogen gas stream to the suction side of the product compressor based on measuring one or more of the average molecular weight of the product gas, hydraulic pressures of the compressor, an inlet gas temperature and a compressor rotation speed. The flow rates of the supplemental hydrocarbon stream and/or the supplemental hydrogen gas stream to the compressor can be varied to cause an adjustment to a composition of the gas stream entering the compressor e.g., an average molecular weight of the product gas at the suction side of the product compressor which is consistent with a steady state operation or the normal operating condition for the product compressor. Thus, the current method ensures that the composition of the product gas to the product compressor including the ratio of the hydrocarbons and hydrogen in the product gas to the suction side of the product compressor at start-up remain consistent until the method reaches the steady state or the normal operating condition for the product compressor. The supplemental hydrocarbon stream and/or the supplemental hydrogen gas stream to the suction side of the product compressor may be provided via separate inventory lines. The supplemental hydrocarbon stream and/or the supplemental hydrogen gas stream is provided to the point where there is enough material available at the suction side of the product compressor for normal operating condition. The flow of supplemental hydrocarbon stream and/or the supplemental hydrogen gas stream is thereafter stopped when the method attains the steady state or the normal operating condition for the product compressor.

In accordance with the present disclosure, a PDH process is shown in FIG. 1. The conditions in the dehydrogenation reactor 101 may include a temperature of about 500 to about 800° C., a pressure of about 40 to about 310 kPa and a catalyst to oil ratio of about 5 to about 100. The dehydrogenation reaction may be conducted in a fluidized manner such that gas, which may comprise the reactant paraffins with or without a fluidizing inert gas, is distributed to the reactor in a way that lifts the dehydrogenation catalyst in the reactor vessel while catalyzing the dehydrogenation of paraffins. During the catalytic dehydrogenation reaction, coke is deposited on the dehydrogenation catalyst leading to reduction of the activity of the catalyst. The dehydrogenation catalyst must then be regenerated.

An exemplary PDH reactor 101 is shown in FIG. 1. The PDH reactor 101 may comprise two chambers, a reaction chamber 114 and a separation chamber 116. A feed line 102 may charge a feed stream of paraffins to the reactor 101 through a feed inlet 109. The feed stream may predominantly comprise propane or butane, but other paraffins such as ethane may be present in the feed stream in conjunction with or to the exclusion of other paraffins. Any suitable feed distributor can be used to distribute the feed stream to the reactor 101. A domed feed distributor 120 may be utilized in the reaction chamber 114 of the reactor 101. The domed feed distributor 120 receives a gaseous paraffinic feed stream and distributes the feed stream through nozzles in the top dome of the domed reactant distributor 120 to distribute the feed stream across the entire cross section of the reaction chamber 114. It is envisioned that other fluidizing gases may be used to also promote fluidization in the reaction chamber 114. In an embodiment, the distributed feed stream and catalyst ascend in the reaction chamber 114 and the reactor 101.

A recycle catalyst pipe 124 has an outlet end comprising a first catalyst inlet 123 which in an embodiment may be connected to and in upstream communication with the reaction chamber 114. The recycle catalyst pipe 124 passes a first stream of recycled spent catalyst that has not undergone regeneration through the outlet end and the first catalyst inlet 123 to the reaction chamber 114 in an embodiment. The recycle catalyst pipe 124 recycles spent catalyst to the reaction chamber 114 through the first catalyst inlet 123.

A second catalyst inlet 125 delivers a second catalyst stream to the reactor 101. A regenerated catalyst pipe 126 is in downstream communication with a catalyst regenerator 160. The regenerated catalyst pipe 126 passes a second stream of regenerated catalyst from a regenerator 160 to the second catalyst inlet 125. The second catalyst inlet 125 provides regenerated catalyst to the reaction chamber 114.

The reaction chamber 114 comprise a vertical wall 115 which may be cylindrical. The vertical wall extends between two graduated sections of decreasing inner diameters moving away from the vertical wall: a bottom distribution section 112 and an upper transition section 122. In the reaction chamber 114 the first stream of catalyst and the second stream of catalyst mix together in a dense bed 128 of mixed catalyst having an upper interphase 129. The height of dense catalyst bed may be adjusted via catalyst recycle through the first catalyst inlet 123 to achieve the desired weight hourly space velocity (WHSV).

The feed stream is contacted with the catalyst in the dense bed 128, and the reactant paraffins undergo endothermic conversion to olefins, typically propane to propylene. The feed stream and the catalyst rise from the dense bed 128 in the reaction chamber 114 of the reactor 101 impelled by the feed stream continually entering the reactor 101 and molar expansion and enter into a dilute phase 130.

At an interface 129, the fluid dynamics transition from a dense bed 128 of catalyst below the interface to a fast-fluidized flow regime in the dilute phase region 130. The gaseous feed stream and mixed catalyst ascend in a fast-fluidized flow regime in which catalyst may slip relative to the gas and the gas can take indirect upward trajectories.

The dehydrogenation catalyst selected should minimize cracking reactions and favor dehydrogenation reactions. Suitable catalysts for use herein include an active metal which may be dispersed in a porous inorganic carrier material such as silica, alumina, silica alumina, zirconia, or clay. An exemplary embodiment of a catalyst includes alumina or silica-alumina containing gallium, a noble metal, and an alkali or alkaline earth metal.

The catalyst support comprises a carrier material, a binder and an optional filler material to provide physical strength and integrity. The carrier material may include alumina or silica-alumina. Silica sol or alumina sol may be used as the binder. The alumina or silica-alumina generally contains alumina of gamma, theta and/or delta phases. The catalyst support particles may have a nominal diameter of about 20 to about 200 micrometers with the average diameter of about 50 to about 150 micrometers. Preferably, the surface area of the catalyst support is 85-140 $m^2/g$.

The dehydrogenation catalyst may comprise a dehydrogenation metal on a support. The dehydrogenation metal may be a one or a combination of transition metals. A noble metal may be a preferred dehydrogenation metal such as platinum or palladium. Gallium is an effective metal for paraffin dehydrogenation. Metals may be deposited on the catalyst support by impregnation or other suitable methods or included in the carrier material or binder during catalyst preparation.

The acid function of the catalyst should be minimized to prevent cracking and favor dehydrogenation. Alkali metals and alkaline earth metals may also be included in the catalyst to attenuate the acidity of the catalyst. Rare earth metals may be included in the catalyst to control the activity of the catalyst. Concentrations of 0.001% to 10 wt % metals may be incorporated into the catalyst. In the case of the noble metals, it is preferred to use about 10 parts per million (ppm) by weight to about 600 ppm by weight noble metal. More preferably it is preferred to use 10-100 ppm by weight noble metal. The preferred noble metal is platinum. Gallium should be present in the range of 0.3 wt % to about 3 wt %, preferably about 0.5 wt % to about 2 wt %. Alkali and alkaline earth metals are present in the range of about 0.05 wt % to about 1 wt %.

The feed stream lifts a mixed stream of catalyst comprising the first stream of catalyst mixed with the second stream of catalyst upwardly in the reaction chamber while paraffins convert to olefins in the presence of the dehydrogenation catalyst. The catalyst gradually becomes spent catalyst attributed to the agglomeration of coke deposits on the catalyst. A fluidizing inert gas may be distributed to the reaction chamber to assist in lifting the mixture of catalyst and reactants upwardly in the reaction chamber 114. The feed gases convert to product gases while ascending in the reaction chamber 114. The blend of gases and catalyst ascend from the reaction chamber 114 through a frustoconical transition section 122 into a transport riser 132 which has a smaller diameter than an inner diameter of the reaction chamber 114. A blend of gases and catalyst accelerate in the narrower transport riser 132 and are discharged from a primary catalyst separator 134 into the separation chamber 116. The primary catalyst separator 134 may be a riser termination device that utilizes horizontal, centripetal acceleration to separate spent catalyst from product gas. Arcuate ducts of the primary catalyst separator 134 direct the mixture of product gas and catalyst to exit from the riser 132 in a typically horizontally angular direction to centripetally accelerate causing the denser catalyst to gravitate outwardly. The catalyst loses angular momentum and falls into a separator catalyst bed 136 depicted with an upper interphase. The lighter gases ascend in the separation chamber 116 and enter into cyclones 138, 140. The cyclones 138, 140 may comprise first and second cyclonic stages of separation to further remove catalyst from product gases. The product gas is ducted to a plenum 142 from which it is discharged from the reactor 101 through a product outlet 144 in a product line.

Catalyst separated from the product gas by the primary catalyst separator 134 drops into the dense catalyst bed 136. In an aspect, primary cyclones 138 may collect product gas from the separation chamber 116 and transport the product gas separated from catalyst to a secondary cyclone 140 to further separate catalyst from the product gas before directing secondarily purified product gas to the plenum 142. Catalyst separated from product gas in the cyclones 138, 140 is dispensed by dip legs into the dense catalyst bed 136. At this point, the separated catalyst in the separation chamber 116 is considered spent catalyst because deposits of coke are agglomerated thereon. A spent catalyst stream taken from the spent catalyst collected in the dense bed 136 in the separation chamber 116 is transported in a spent catalyst pipe 118 to a catalyst regenerator 160 to have coke burned from the catalyst to regenerate and heat the dehydrogenation catalyst.

A recycle catalyst stream is also taken from the spent catalyst collected in the dense bed 136 of the separation chamber 116 and enters the recycle catalyst pipe 124 through an inlet end 121. The recycle catalyst pipe 124 has the inlet end 121 connected to the separation chamber 116 and an outlet end 123 connected to the reaction chamber 114 for recycling catalyst to the reaction chamber. The recycle catalyst stream of the spent catalyst is recycled in the recycle catalyst pipe 122 back to the first catalyst inlet 123 in the reaction chamber 114 of the reactor 101. The first catalyst inlet 123 is the outlet end of the recycle catalyst pipe 124. The recycle catalyst stream of the spent catalyst is not regenerated before it returns to the reaction chamber 114.

The separation chamber 116 may include a disengagement can 146 that surrounds the upper end of the riser 132 and the primary separator 134. A vertical wall 147 of the disengagement can 146 is spaced apart from a shell 148 of the separation chamber to define an annulus 149. Dip legs of the cyclones 138 and 140 may be located in the annulus 149. The disengagement can 146 serves to limit travel of the product gas exiting the primary separator 134, so as to reduce its time in the reactor 101, thereby mitigating unselective cracking reactions to undesired products. The top of the disengagement can 146 may be hemispherical and feed a gas recovery conduit 150 that transports product gases to ducts 152 that are directly ducted or connected to the primary cyclones 138. The direct ducting from the disengagement can 146 to the primary cyclones 138 also prevents product gas from getting loose in the larger volume of the reactor vessel where excessive residence time may occur to permit unselective cracking. Windows in the lower section of the wall 148 of the disengagement can 146 permit catalyst in the disengagement can 146 to enter into the recycle catalyst pipe 122 or the spent catalyst pipe 118. A quench fluid such as condensed product liquid, cooled recycled gas, or even cool catalyst may be injected into the product gases through a quench nozzle 154 to cool the product gases to below cracking temperature to limit unselective cracking. Quench fluid is advantageously injected into the gas recovery conduit 150 which directs the separated product gas to a narrowed location. The gas recovery conduit 150 is in downstream communication with primary catalyst separator 134 which separates the predominance of the spent catalyst from the product gases. The primarily separated spent catalyst bypasses quenching to retain heat in the catalyst. The product gases separated from the predominance of the catalyst subjects a reduced mass of material to quenching thereby requiring less quench fluid to achieve sufficient cooling to reduce the temperature of product gas to below cracking temperature.

The spent catalyst may be stripped with inert gas in a stripper vessel 158 depending from the separation vessel 116 and be transported to the catalyst regenerator vessel 160 in a spent catalyst pipe 118 to regenerate the spent catalyst into regenerated catalyst and to combust the coke if present. Fuel gas may be added to the catalyst regenerator vessel 160 to further heat catalyst by combustion. A regenerated catalyst pipe 126 transports regenerated catalyst from the regenerator 160 to the reactor 101 through a control valve thereon through the second catalyst inlet 125.

As stated earlier, during the start-up, there is a reduced mass of material available at the suction side of the product compressor 46 compared to the normal operating condition. Initially the feed, reactor, and downstream equipment is inventoried with a mixture of hydrogen and paraffin feed that matches the average molecular weight of the product gas during normal operating condition. As the product compressor increases normal discharge conditions additional hydrogen gas and/or a hydrocarbon stream can be metered separately and introduced in portions that will keep average molecular weight through the product compressor 46 within the desired range and with minimal variance in average molecular weight. Possible adjustments in the flow rate for the supplemental hydrogen gas stream and/or the supplemental hydrocarbon stream allows the product compressor 46 to operate within its desirable range of molecular weight while circulating unreacted product though the product separation equipment and back to the reactor 101. Hydrogen in the product stream is recovered and reintroduced to the reactor circuit to maintain the desired average molecular weight. As the reactor 101 heats up and the dehydrogenation reaction starts to occur, the quantity of hydrogen recycle can be decreased to maintain the same targeted molecular weight for the product compressor 46. In an embodiment, the hydrocarbon stream is selected from one or both of a propane stream and an isobutane stream. If the PDH unit is a C3 unit, the hydrocarbon stream to the compressor includes the propane stream. If the PDH unit is a C4 unit, the hydrocarbon stream to the compressor includes the isobutane stream. For a C3-C4 mixed feed PDH units, the hydrocarbon stream to the compressor may include both the propane stream and the isobutane stream. In an exemplary embodiment, the hydrocarbon stream to the compressor is a propane stream.

The vaporous reactor effluent stream in line 162 comprises light hydrocarbon and heavy hydrocarbon products and entrained catalyst. The catalyst is predominantly catalyst fines which have a largest diameter of no more than 40μ and preferably no more than 20μ. The vaporous reactor effluent stream may be cooled in cooler 15 such as an effluent cooler and fed to a contaminant removal unit 40 for removal of catalyst fines, water, acid gases and chlorides such as by use of a contact cooler, acid gas absorption, water washing and drying. The contaminant removal unit 40 may also be equipped to remove heavy hydrocarbons in line 41 from the reactor effluent stream in line 162. A purified reactor effluent stream is withdrawn as a product gas stream from the contaminant removal unit 40 in line 42. The product gas stream in line 42 is compressed prior to further separation. In an embodiment, the product gas stream in line 42 is passed to a product compressor 46 to compress the product gas stream and provide a compressed product gas stream in line 47.

In accordance with the present disclosure, a sulfiding agent may be provided to the PDH process. The sulfiding agent in the presence of hydrogen will produce chromium sulfide scale on the surrounding hot metal surfaces that will prevent metal catalyzed coking which is detrimental to process operations. In an exemplary embodiment, the sulfiding agent may be introduced at least at two points in the present method. The sulfiding agent may be provided along with the feed stream to the PDH process. The sulfiding agent may be injected into a feed side of a combined feed exchanger (not shown) and fed to the PDH reactor along with the feed stream. The sulfiding agent may also be injected between the reactor outlet 144 and the product compressor 46. During start up, hydrogen will be recycled from the product compressor 46 and product separation back to the reactor inlet. The presence of hydrogen in the reactor circuit during startup will facilitate treating metal surfaces to resist metal catalyzed coking. In another exemplary embodiment, the sulfiding agent may be selected from one or both of dimethyl sulfide or dimethyldisulfide (DMDS).

In an exemplary embodiment, the product compressor 46 is a dynamic compressor. Each dynamic compressor has a surge limit that represents a limit on operation of the compressor. Centrifugal or axial compressors may be referred to as dynamic compressors or turbomachinery. Such compressors often have other components immediately upstream and downstream that enhance or enable the functioning of the compressor. Examples of such equipment include isolation valves, suction strainers, a compressor suction drum or separator, an anti-surge spillback takeoff, a feed mix node and combined feed exchanger for recycle, and an interstage drum or knockout drum.

Performance of the compressors may be affected by changes in gas conditions, including gas pressure and the composition and/or average molecular weight of the gas, among other factors. Process control of capacity may be made by speed variation, suction throttling, variable stator vanes (axial compressor only) or inlet guide vanes.

The method disclosed herein may include different types of sensors that may be used in and around the product compressor 46. Data related to the operating condition associated with the product compressor 46 from the sensors can then be analyzed in a manual and/or automated manner. Corrective actions or recommendations to adjust and maintain the operating condition associated with the product compressor 46 towards a predetermined operating condition associated with a steady-state operation of the product compressor 46 can be generated based on such analysis. The corrective actions or recommendations comprise adjusting and maintaining a flow of the supplemental hydrocarbon stream in line 43 and/or the supplemental hydrogen gas stream in line 44 to the product compressor 46 along with the product gas to attain the predetermined operating condition associated with a steady-state operation of the product compressor 46. The step of passing of the supplemental hydrocarbon stream in line 43 and/or the supplemental hydrogen gas stream in line 44 to the suction side of product compressor 46 during start-up can be operated manually or the steps can be automated. In an exemplary embodiment, step of passing the supplemental hydrocarbon stream in line 43 and/or the supplemental hydrogen gas stream in line 44 to the suction side of product compressor 46 during start-up may be automated. The supplemental hydrocarbon stream in line 43 and/or the supplemental hydrogen gas stream in line 44 may be passed to the product compressor 46 along with the product gas stream 42. In an exemplary embodiment, the product gas stream 42 may be combined with the supplemental hydrocarbon stream in line 43 and/or the supplemental hydrogen gas stream in line 44 to provide a combined effluent stream in line 45. The combined effluent stream in line 45 may be passed to the product compressor 46.

In an exemplary embodiment, sensor (A) 1012 and/or sensor (B) 1014 may be provided on line 42 and 45 respectively at the suction side of the product compressor 46 to measure the operating condition of the product compressor 46 including the composition of the product gas in line 42 and/or 45, respectively. In another exemplary embodiment, the step of passing the supplemental hydrocarbon stream in line 43 and/or the supplemental hydrogen gas stream in line 44 to the suction side of product compressor 46 during start-up is automated via a computing system environment 1000. Data related to the operating condition associated with the product compressor 46 from sensor (A) 1012 and sensor (B) 1014 can then be analyzed in an automated manner in the computing system environment 1000 (described later in detail). Based on analyzing the operating condition associated with the product compressor 46 in the computing system environment 1000, the flow of the supplemental hydrocarbon stream in line 43 and/or the supplemental hydrogen gas stream in line 44 to the product compressor 46 during start-up can be regulated via control valves 1042 and 1044 provided on the lines 43 and 44 respectively.

For example, the sensor (A) may measure a parameter of the product gas stream in line 42 and communicate the data to the computing system environment 1000. The computing system environment 1000 would then calculate the molecular weight of the product gas stream in line 42 compare it against a predetermined set point range which may be a normal range of molecular weight of the product gas stream during normal or steady state operation. The computing system environment 1000 would determine if the molecular weight of the product gas stream is below the predetermined range of molecular weight set point or above the predetermined range of molecular weight. If the computing system determines the molecular weight of the product gas stream in line 42 is below the normal operating range, the computing system environment 1000 would communicate to the control valve 1042 to open to an appropriately greater open position to increase the flow rate of the supplemental hydrocarbon stream in line 43 to the combined product gas stream in line 45. Alternatively, the computing system environment 1000 would communicate to the control valve 1044 to close to an appropriately lesser open position to decrease the flow rate of the supplemental hydrogen stream in line 44 to the combined product gas stream in line 45. On the other hand, if the computing system determines the molecular weight of the product gas stream in line 42 is above the normal operating range, the computing system environment 1000 would communicate to the control valve 1044 to open to an appropriately greater open position to increase the flow rate of the supplemental hydrogen stream in line 44 to the combined product gas stream in line 45. Alternatively, the computing system environment 1000 would communicate to the control valve 1042 to close to an appropriately lesser open position to decrease the flow rate of the supplemental hydrocarbon stream in line 44 to the combined product gas stream in line 45. Accordingly, the molecular weight of combined product gas in line 45 to the product compressor 46 will always be in the normal operating range.

The introduction of supplemental hydrocarbon stream and/or the supplemental hydrogen gas stream for the start-up method may be provided for inter alia two objectives: (1) to maintain a target gas composition considering the ongoing dehydrogenation of paraffins reaction occurring during start-up or turn down of the PDH reactor 101 and (2) to maintain/achieve a desired operating pressure for the product compressor 46 during start-up or turn down of the PDH unit.

It is understood that any sensor described herein may be configured for communicating the data gathered by the sensor to a computer system, including by various wired or wireless technologies. In one or more embodiments, each sensor described herein may include a wireless transmitter (or transceiver) for wirelessly communicating with a computer system. In another embodiment, some or all of the sensors described herein may include an individual processor and/or memory configured for processing communications to/from the computer system or processing and/or storing data independently or in conjunction with the computer system.

Figure 2:
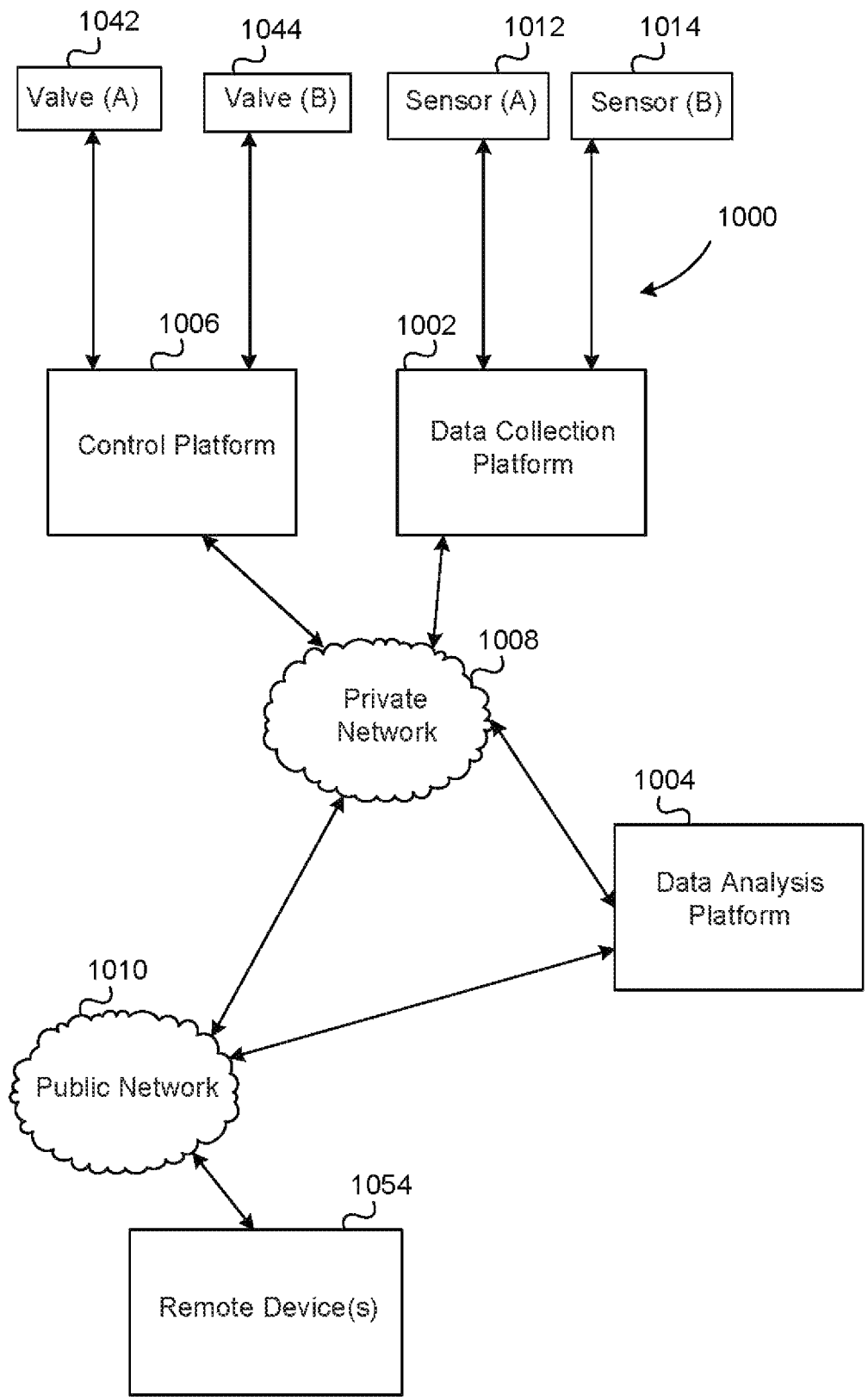
FIG. 2 depicts an illustrative computing environment for managing the operation of a compressor in a PDH process during start-up in accordance with one or more exemplary embodiments.

In accordance with the current disclosure, the start-up method may include one or more computing devices or platforms for collecting, storing, processing, and analyzing data from one or more sensors associated with the product compressor 46. FIG. 2 depicts an illustrative computing system that may be implemented at one or more components, pieces of equipment used in the PDH process. In an exemplary embodiment, the illustrative computing system as shown in FIG. 2 may be implemented at the product compressor 46 of the PDH process. FIGS. 2-6, show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 2 depicts an illustrative operating environment in which the start-up method of the present disclosure may be implemented in accordance with an exemplary embodiment. The computing system environment 1000 illustrated in FIG. 2 is only one example of a suitable computing environment and is not intended to suggest any limitation as to the scope of use or functionality contained in the disclosure. The computing system environment 1000 may include various sensors; e.g. sensor (A) (1012 on product gas line 42 and/or sensor (B) 1014 on combined effluent line 45) measurement, and data capture systems, a data collection platform 1002, a data analysis platform 1004, a control platform 1006, one or more networks, one or more remote device(s) 1054, and/or one or more other elements. The various elements of the computing system environment of FIG. 2 may be communicatively coupled through one or more networks. For example, the various platforms, devices, sensors (1012 and 1014), and/or components of the computing system environment may be communicatively coupled through a private network 1008. The sensors (1012) may be positioned on or within the product compressor 46 and may communicate wirelessly or wired with one or more platforms illustrated in FIG. 2. The private network 1008 may include, in some examples, a network firewall device to prevent unauthorized access to the data and devices on the private network 1008. Alternatively or additionally, the private network 1008 may be isolated from external access through physical means, such as a hard-wired network with no external, direct access point. The data communicated on the private network 1008 may be optionally encrypted for further security. Depending on the frequency of collection and transmission of sensor measurements and other data to the data collection platform 1002, the private network 1008 may experience large bandwidth usage and be technologically designed and arranged to accommodate for such technological issues. Moreover, the computing system environment 1000 may also include a public network 1010 that may be accessible to remote devices (e.g., remote device 1054). In some examples, a remote device may be located not in the proximity (e.g., more than one mile away) of the various sensor, measurement, and data capture systems illustrated in FIG. 2. In other examples, the remote device may be physically located inside a plant but restricted from access to the private network 1008; in other words, the adjective "remote" need not necessarily require the device to be located at a great distance from the sensor systems and other components.

The data collection platform 1002 as shown in FIG. 2 maintains data records of the operating condition associated with the product compressor 46 comprising hydraulic pressure at suction and/or discharge side of the product compressor 46, an inlet gas temperature for the product compressor 46, a compressor rotation speed, and the average molecular weight of the gas stream 42. The data analysis platform 1004 may compare the operating condition associated with the product compressor 46 with the steady state or the normal operating condition of the product compressor 46 to determine if supplemental hydrogen gas stream in line 44 and/or the supplemental hydrocarbon stream in line 43 is required. The data analysis platform 1004 may communicate with the control platform 1006 to cause adjustments or halting/starting of the flow of one or more of the supplemental hydrogen gas stream in line 44 and/or the supplemental hydrocarbon stream in line 43 to the product compressor 46. Adjusting/varying the flow of the supplemental hydrogen gas stream in line 44 and/or the supplemental hydrocarbon stream in line 43 to product compressor 46 via valves 1044 and 1042 respectively in accordance with the present disclosure provides a consistent composition of the gas stream in line 45 to the product compressor 46 during the start-up period to prevent any sudden shift towards a surge in the product compressor 46.

Although the computing system environment of FIG. 2 illustrates logical block diagrams of various platforms and devices, the disclosure is not so limited. In particular, one or more of the logical boxes in FIG. 2 may be combined into a single logical box or the functionality performed by a single logical box may be divided across multiple existing or new logical boxes. For example, aspects of the functionality performed by the data collection platform 1002 may be incorporated into one or each of the sensor devices illustrated in FIG. 2. As such, the data collection may occur local to the sensor device, and the enhanced sensor system may communicate directly with one or more of the control platform 1006 and/or data analysis platform 1004. An illustrative example of such an embodiment is contemplated by FIG. 2. Moreover, in such an embodiment, the enhanced sensor system may measure values common to a sensor but may also filter the measurements such just those values that are statistically relevant or of interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application specific integrated circuit (ASIC), FPGA (filed-programmable gate array), or other hardware or software-based module for execution of instructions. The sensors 1012 and 1014 shown in FIG. 2 may comprise one or more sensors. In another example, the one or more sensors may be combined into an enhanced, multipurpose sensor system. Such a combined sensor system may provide economies of scale with respect to hardware components such as processors, memories, communication interfaces, and others.

In yet another example, the data collection platform 1002 and data analysis platform 1004 may reside on a single server computer and depicted as a single, combined logical box on a system diagram. Moreover, a data store may be illustrated in FIG. 2 separate and apart from the data collection platform 1002 and data analysis platform 1004 to store a large amount of values collected from sensors and other components. The data store may be embodied in a database format and may be made accessible to the public network 1010; meanwhile, the control platform 1006, data collection platform 1002, and data analysis platform 1004 may be restricted to the private network 1008 and left inaccessible to the public network 1010. As such, the data collected from a plant may be shared with users (e.g., engineers, data scientists, others), a company's employees, and even third parties (e.g., subscribers to the company's data feed) without compromising potential security requirements related to operation of the PDH unit. The data store may be accessible to one or more users and/or remote devices over the public network 1010.

Referring to FIG. 2, process measurements from various sensor and/or monitoring devices may be used to monitor conditions in, around, and on the product compressor 46. Such sensors may include, but are not limited to, pressure sensors, differential pressure sensors, various flow sensors (including but not limited to orifice plate type, disc sensors, venturi, other flow sensors), temperature sensors including thermal cameras and skin thermocouples, capacitance sensors, weight sensors, gas chromatographs, moisture sensors, ultrasonic sensors, position sensors, timing sensors, vibration sensors, microphones, level sensors, liquid level (hydraulic fluid) sensors, and other sensors used in the refining and petrochemical industry. In an exemplary embodiment, an onstream molecular weight analyzer may be used to measure the average molecular weight of the product gas at the suction side of the product compressor 46. An onstream molecular weight analyzer may be also used to measure the average molecular weight of the product gas at a discharge side of the product compressor 46.

In addition, sensors may include transmitters and/or deviation alarms. One or more sensors may be programmed to set off an alarm or alert. For example, if an actuator fails, sensor data may be used to automatically trigger an alarm or alert (e.g., an audible alarm or alert, a visual alarm or alert). Other sensors may transmit signals to a processor or a hub that collects the data and sends to a processor. For example, pressure measurements may be sent to a hub (e.g., data collection platform 1002).

The product compressor 46 may include a pressure sensor and/or a temperature sensor configured to measure the pressure and the temperature within the compressor and/or at suction/discharge. The pressure sensor and/or the temperature sensor may be disposed within the inlet and/or outlet in one or more embodiments, measuring the pressure and the temperature based on suction pressure and temperature and discharge pressure and temperature. One or more sensors may be disposed elsewhere in another embodiment, e.g., within the chamber of the compressor at the impeller(s) and/or the diffuser(s). The sensors are configured for continuous or substantially continuous detection, to permit collection of data dynamically during the operation of the product compressor 46. Additional sensors may be positioned and configured for measuring parameters such as gas flow speed, inlet guide vane angle, and/or suction throttle valve position.

Sensors may be also used around the product compressor 46 to detect and monitor various issues such as PV detection, surge detection, fouling, gas quality, dew point characteristics, and/or production levels. Sensors might be able to detect whether feed composition into the product compressor 46, such as pH are outside of acceptable ranges leading to a corrosive environment. Sensors detecting pressure drops may be used to determine/predict flow and production rate changes for the supplemental hydrogen gas stream in line 44 and/or the supplemental hydrocarbon stream in line 44 at the suction side of the product compressor 46.

Furthermore, flow sensors may be used in flow paths such as the inlet to the path, outlet from the path, or within the path. If multiple tubes are used, the flow sensors may be placed in corresponding positions in each of the tubes. Flow may be determined by pressure drop across a known resistance, such as by using pressure taps. In other examples, flow may be inferred using fluid density in addition to suction and discharge pressures. Other types of flow sensors include, but are not limited to, ultrasonic, turbine meter, hot wire anemometer, vane meter, vortex sensor, membrane sensor (membrane has a thin film temperature sensor printed on the upstream side, and one on the downstream side), tracer, radiographic imaging (e.g. identify two-phase vs single-phase region of channels), an orifice plate (e.g., which may in some examples, be placed in front of one or more tube or channels), pitot tube, thermal conductivity flow meter, anemometer, internal pressure flow profile.

Sensor data, process measurements, and/or calculations made using the sensor data or process measurements may be used to monitor and/or improve the performance of the product compressor 46. Chemical sensors may be used to detect the presence of one or more chemicals or components in the streams, such as corrosive species, oxygen, hydrogen, and/or water (moisture). Chemical sensors may use gas chromatographs, liquid chromatographs, distillation measurements, and/or octane measurements. In another example, equipment information, such as wear, efficiency, production, state, or other condition information, may be gathered and determined based on sensor data. Corrective action may be taken based on determining this equipment information.

Sensor data may be collected by a data collection platform 1002. The sensors may interface with the data collection platform 1002 via wired or wireless transmissions. The data collection platform 1002 may continuously or periodically (e.g., every second, every minute, every hour, every day, once a week, once a month) transmit collected sensor data to a data analysis platform 1004, which may be nearby or remote from the data collection platform 1002.

Sensor data e.g., pressure data, or the average molecular weight data from the onstream molecular weight analyzer may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). The data collection platform 1002 transmit collected sensor data to a data analysis platform 1004, which may be nearby or remote from the data collection platform 1002.

Figure 3:
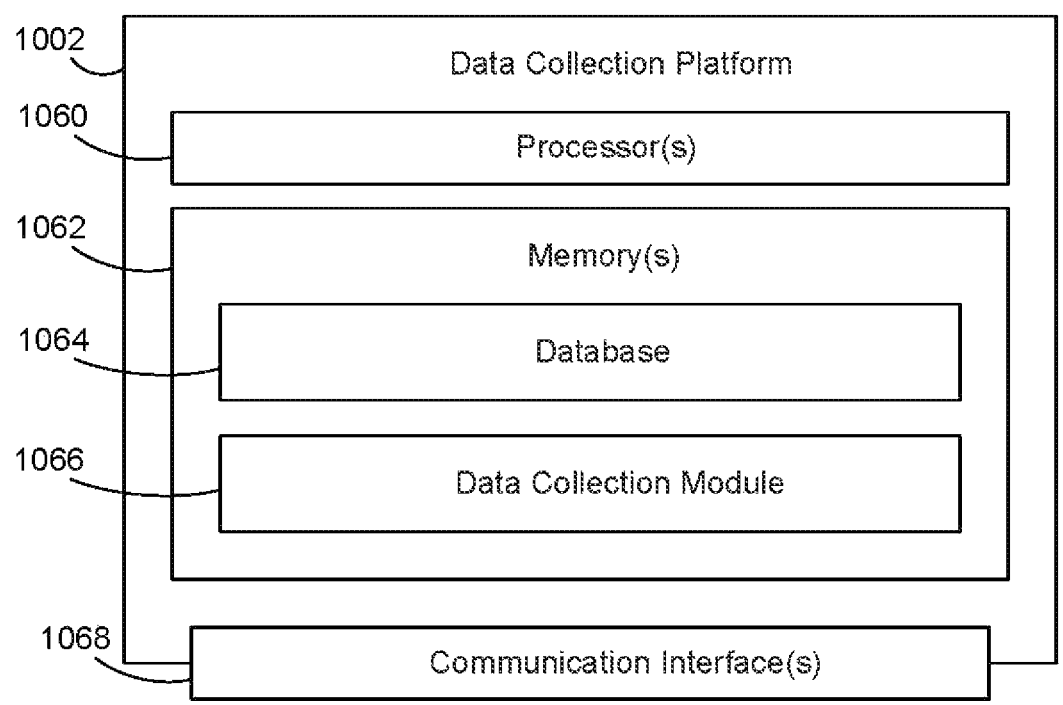
FIG. 3 depicts an illustrative data collection computing platform for collecting data related to the compressor in the PDH process during start-up in accordance with one or more exemplary embodiments.
Figure 4:
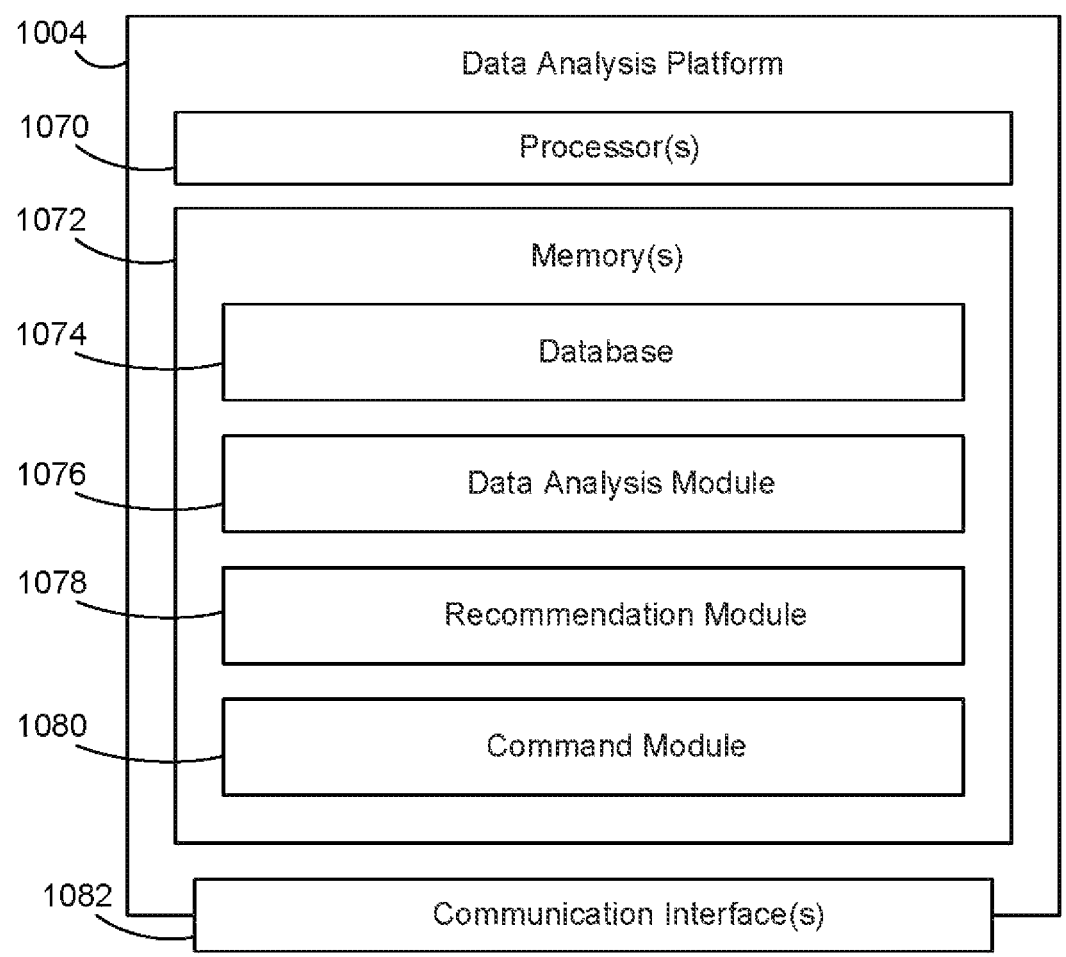
FIG. 4 depicts an illustrative data analysis computing platform for analyzing data related to the operation of the compressor in the PDH process during start-up in accordance with one or more exemplary embodiments.
Figure 5:
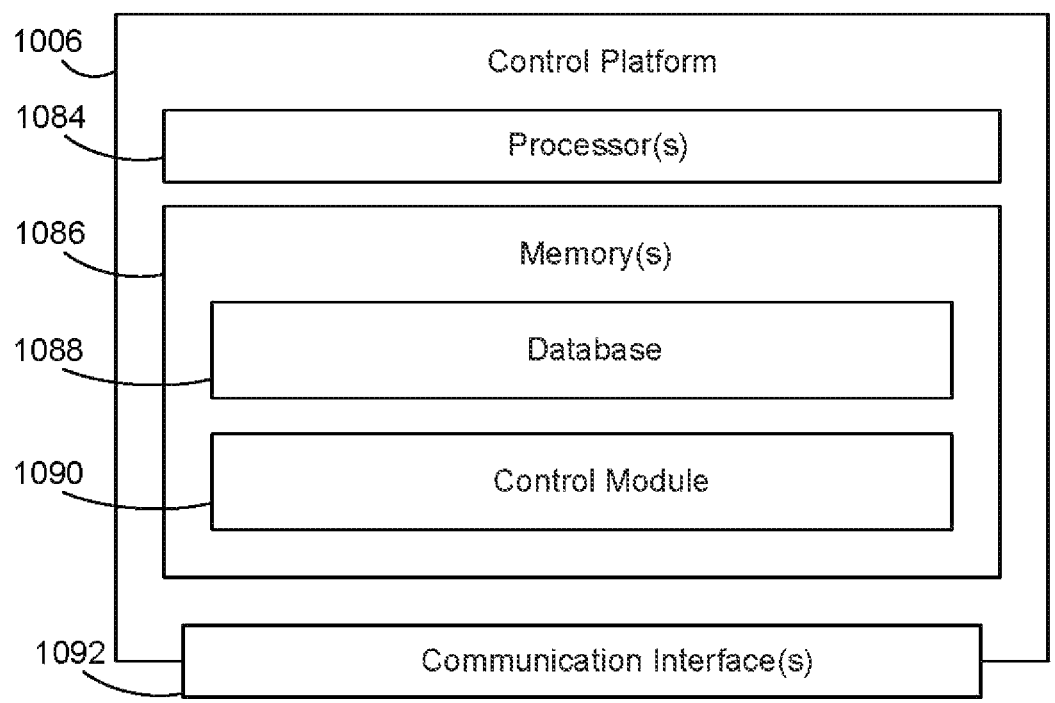
FIG. 5 depicts an illustrative data analysis computing platform for analyzing data related to the operation of the compressor in the PDH process during start-up in accordance with one or more exemplary embodiments.
Figure 6:
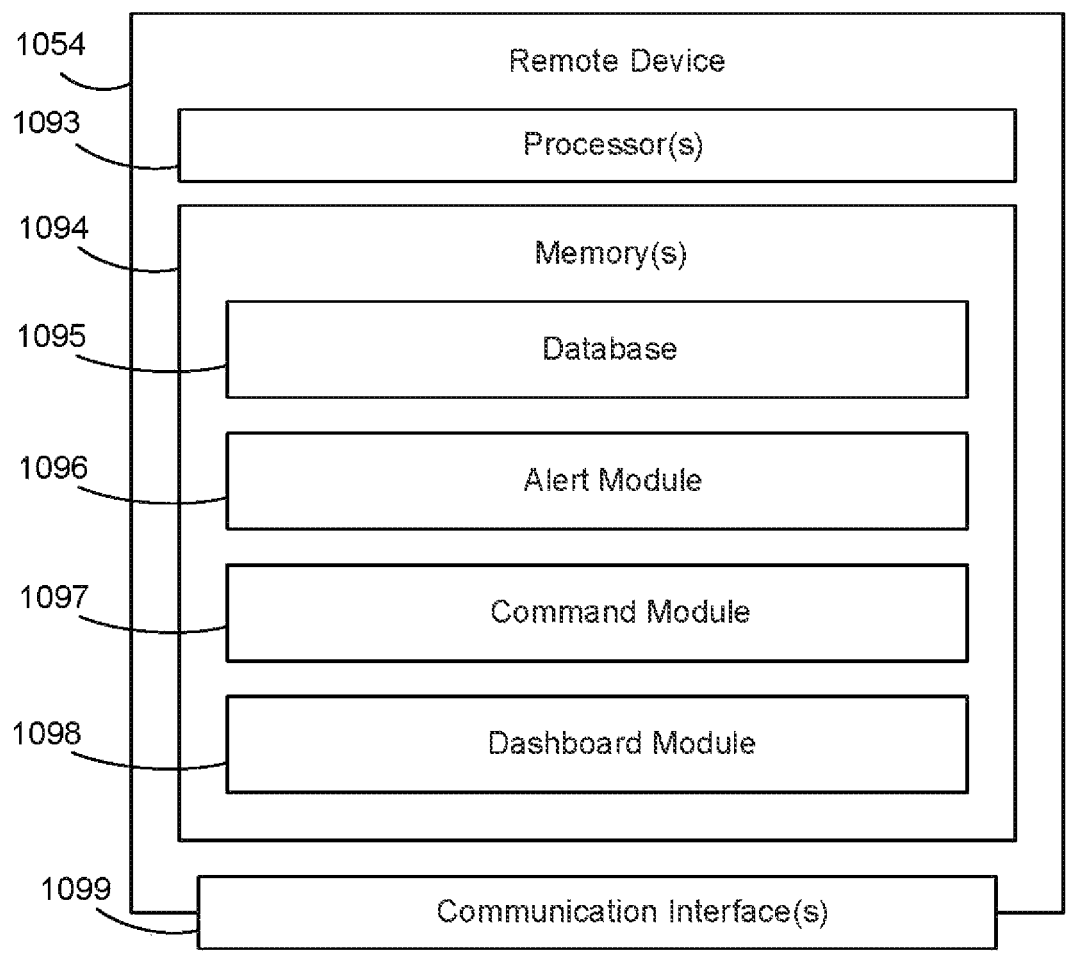
FIG. 6 depicts an illustrative control computing platform for controlling the compressor in the PDH process during start-up in accordance with one or more exemplary embodiments.

The computing system environment of FIG. 2 includes logical block diagrams of different platforms and devices that are further elaborated upon in FIG. 3-6. FIG. 3 is an illustrative data collection platform 1002. FIG. 4 is an illustrative data analysis platform 1004. FIG. 5 is an illustrative control platform 1006. FIG. 6 is an illustrative remote device 1054. These platforms and devices of FIG. 2-6 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIGS. 2-6 may include one or more memories include any of a variety of computer readable media. Computer-readable media may be any available media that may be accessed by the data collection platform 1002, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform 1002. The memories in the platform and/or devices may further store modules that may include compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIGS. 2-6 may include one or more communication interfaces including, but are not limited to, a microphone, keypad, keyboard, touch screen, and/or stylus through which a user of a computer (e.g., a remote device) may provide input, and may also include a speaker for providing audio output and a video display device for providing textual, audiovisual and/or graphical output. Input may be received via one or more graphical user interfaces, which may be part of one or more dashboards (not shown). The communication interfaces may include a network controller for electronically communicating (e.g., wirelessly or wired) over a public network 1010 or private network 1008 with one or more other components on the network. The network controller may include electronic hardware for communicating over network protocols, including TCP/IP, UDP, Ethernet, and other protocols.

In some examples, one or more sensor devices in FIG. 2 may be enhanced by incorporating functionality that may otherwise be found in a data collection platform 1002. The enhanced sensor system may provide further filtering of the measurements and readings collected from their sensor devices. For example, with some of the enhanced sensor systems in the operating environment illustrated in FIG. 2, an increased amount of processing may occur at the sensor so as to reduce the amount of data needing to be transferred over a private network 1008 in real-time to a computing platform. The enhanced sensor system may filter at the sensor itself the measured/collected/captured data and only particular, filtered data may be transmitted to the data collection platform 1002 for storage and/or analysis.

Referring to FIG. 3, in one or more embodiments, a data collection platform 1002 may include one or more processors 1060, one or more memories 1062, and communication interfaces 1068. The memory 1062 may include a database 1064 for storing data records of various values collected from one or more sources. In an exemplary embodiment, the memory 1062 may include the database 1064 for storing data records of the operating condition associated with the product compressor 46 comprising the hydraulic pressure at suction and/or discharge side of the product compressor 46, the inlet gas temperature for the product compressor 46, the compressor rotation speed, and the average molecular weight of the product gas stream. In addition, a data collection module 1066 may be stored in the memory 1062 and assist the processor 1060 in the data collection platform 1002 in communicating with, via the communications interface 1068, one or more sensor, measurement, and data capture systems, and processing the data received from these sources. In some embodiments, the data collection module 1066 may include computer-executable instructions that, when executed by the processor 1060, cause the data collection platform 1002 to perform one or more of the steps disclosed herein. In other embodiments, the data collection module 1066 may be a hybrid of software-based and/or hardware-based instructions to perform one or more of the steps disclosed herein. In some examples, the data collection module 1066 may assist an enhanced sensor system with further filtering the measurements and readings collected from the sensor devices. Although the elements of FIG. 3 are illustrated as logical block diagrams, the disclosure is not so limited. In particular, one or more of the logical boxes in FIG. 3 may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1064 in FIG. 3 is illustrated as being stored inside one or more memories 1062 in the data collection platform 1002, FIG. 3 contemplates that the database 1064 may be stored in a standalone data store communicatively coupled to the data collection module 1066 and processor 1060 of the data collection platform 1002 via the communications interface 1068 of the data collection platform 1002.

In addition, the data collection module 1066 may assist the processor 1060 in the data collection platform 1002 in communicating with, via the communications interface 1068, and processing data received from other sources, such as data feeds from third-party servers and manual entry at the field site from a dashboard graphical user interface.

Referring to FIG. 4, in one or more embodiments, the data analysis platform 1004 may include one or more processors 1070, one or more memories 1072, and communication interfaces 1082. The memory 1072 may include a database 1074 for storing data records of various values collected from one or more sources. In an exemplary embodiment, the memory 1072 may include the database 1074 for storing data records of the operating condition associated with the product compressor 46 comprising the hydraulic pressure at suction and/or discharge side of the product compressor 46, the inlet gas temperature for the product compressor 46, the compressor rotation speed, and the average molecular weight of the product gas stream 42. In another exemplary embodiment, the memory 1072 may include the database 1074 for storing data records of a predetermined operating condition associated with a steady-state operation of the product compressor 46 comprising a hydraulic pressure at suction and/or discharge side of the product compressor 46, an inlet gas temperature for the product compressor 46, a compressor rotation speed, and an average molecular weight of the product gas stream 42.

Alternatively or additionally, the database 1074 may be the same database as that depicted in FIG. 3 and the data analysis platform 1004 may communicatively couple with the database 1074 via the communication interface of the data analysis platform 1004. At least one advantage of sharing a database between the two platforms is the reduced memory requirements due to not duplicating the same or similar data. In addition, a data analysis module 1076 may be stored in the memory 1072 and assist the processor 1070 in the data analysis platform 1004 in processing and analyzing the data values stored in the database 1074. In some embodiments, the data analysis module 1076 may include computer-executable instructions that, when executed by the processor 1070, cause the data analysis platform 1004 to perform one or more of the steps disclosed herein. In other embodiments, the data analysis module 1076 may be a hybrid of software-based and/or hardware-based instructions to perform one or more of the steps disclosed herein. In some embodiments, the data analysis module 1076 may perform statistical analysis, predictive analytics, and/or machine learning on the data values in the database 1074 to generate predictions and models based on the predetermined operating condition associated with a steady-state operation of the product compressor 46. For example, the data analysis platform 1004 may analyze sensor data to detect if sufficient material is available at the suction side of the product compressor 46 compared to the steady state or the normal operating condition of the product compressor 46. The data analysis platform 1004 may compare one or more of the hydraulic pressure at suction and/or discharge side of the product compressor 46, the inlet gas temperature for the product compressor 46, the compressor rotation speed, and the average molecular weight of the product gas stream 42 with their respective value for the steady state or the normal operating condition of the product compressor 46 to determine if the supplemental hydrogen gas stream in line 44 and/or the supplemental hydrocarbon stream in line 43 is required. In an embodiment, data analysis platform 1004 may compare pressure or the average molecular weight of the product gas at the suction side of the product compressor 46 with the steady state or the normal operating condition of the product compressor 46 to determine if the supplemental hydrogen gas stream in line 44 and/or the supplemental hydrocarbon stream in line 43 is required. Such comparisons may be made on a monthly, weekly, daily, hourly, real-time, or some other basis.

Referring to FIG. 4, the recommendation module 1078 in the data analysis platform 1004 may coordinate with the data analysis module 1076 to generate recommendations for adjusting the flow of the supplemental hydrogen gas stream in line 44 and/or the supplemental hydrocarbon stream in line 43 to the product compressor 46. In some embodiments, the recommendation module 1078 may communicate the recommendation to the command module 1080, which may generate command codes that may be transmitted, via the communications interface, to cause adjustments or halting/starting of the flow of one or more of the supplemental hydrogen gas stream in line 44 and/or the supplemental hydrocarbon stream in line 43 to the product compressor 46. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute on them.

Although the elements of FIG. 4 are illustrated as logical block diagrams, the disclosure is not so limited. In particular, one or more of the logical boxes in FIG. 4 may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 4 as being stored inside one or more memories in the data analysis platform 1004, FIG. 4 contemplates that the database may be stored in a standalone data store communicatively coupled to the data analysis module and processor of the data analysis platform 1004 via the communications interface of the data analysis platform 1004.

Referring to FIG. 5, in one or more embodiments, a control platform 1006 may include one or more processors 1084, one or more memories 1086, and communication interfaces 1092. The memory 1086 may include a database 1088 for storing data records of various values transmitted from a user interface, computing device, or other platform. The values may include parameter values for the product compressor 46 in the PDH unit For example, some illustrative equipment at the plant that may be configured and/or controlled by the control platform 1006 include, but is not limited to, feed switcher, valves, or one or more pumps/compressors. In addition, a control module 1090 may be stored in the memory and assist the processor in the control platform 1006 in receiving, storing, and transmitting the data values stored in the database. In some embodiments, the control module 1090 may include computer-executable instructions that, when executed by the processor 1084, cause the control platform 1006 to perform one or more of the steps disclosed herein. In other embodiments, the control module may be a hybrid of software-based and/or hardware-based instructions to perform one or more of the steps disclosed herein.

Referring to FIG. 6, in one or more embodiments, a remote device 1054 may include one or more processors 1093, one or more memories 1094, and communication interfaces 1099. The memory 1094 may include a database 1095 for storing data records of various values entered by a user or received through the communications interface. In addition, an alert module 1096, command module 1097, and/or dashboard module 1098 may be stored in the memory 1094 and assist the processor 1093 in the remote device 1054 in processing and analyzing the data values stored in the database. In some embodiments, the aforementioned modules may include computer-executable instructions that, when executed by the processor, cause the remote device 1054 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a warning condition due to odd sensor readings. The command module 1097 in the remote device 1054 may generate a command that when transmitted through the communications interface to the platforms, causes adjusting of one or more parameter operations of the product compressor 46. A dashboard module 1098 may display a graphical user interface to a user of the remote device 1054 to enable the user to enter desired parameters and/or commands. These parameters/commands may be transmitted to the command module 1097 to generate the appropriate resulting command codes that may be then transmitted, via the communications interface, to cause adjustments or halting/starting of one or more operations related to the product compressor 46. The command codes may be transmitted to a control platform 1006 for processing and/or execution. In one or more embodiments, the command codes may be directly communicated, either wirelessly or in a wired fashion, to physical components at the plant such that the physical components include an interface to receive the commands and execute them.

Although FIG. 6 is not so limited, in some embodiments the remote device 1054 may include a desktop computer, a smartphone, a wireless device, a tablet computer, a laptop computer, and/or the like. The remote device 1054 may be physically located locally or remotely and may be connected by one of communications links to the public network 1010 that is linked via a communications link to the private network 1008. The network used to connect the remote device 1054 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network 1008 (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 6 are illustrated as logical block diagrams, the disclosure is not so limited. In particular, one or more of the logical boxes in FIG. 6 may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database is visually depicted in FIG. 6 as being stored inside one or more memories in the remote device 1054, FIG. 6 contemplates that the database may be stored in a standalone data store communicatively coupled, via the communications interface, to the modules stored at the remote device 1054 and processor of the remote device 1054.

FIGS. 7A-7B depict illustrative system flow diagrams in accordance with one or more embodiments described herein. As shown in FIG. 7A, in step 201, data collection platform 1002 may collect sensor data associated with the product compressor 46. The sensor data associated with the product compressor 46 may include the hydraulic pressure at the suction and/or the discharge side of the product compressor 46, the inlet gas temperature for the product compressor 46, the compressor rotation speed, and the average molecular weight of the gas stream 162. In step 202, data collection platform 1002 may transmit sensor data to the data analysis platform 1004. In step 203, data analysis platform 1004 may analyze data. In step 204, data analysis platform 1004 may send an alert to remote device 1054.

As shown in FIG. 7B, in step 205, data analysis platform 1004 may receive a command from remote device 1054. In step 206, data analysis platform 1004 may send a command to control platform 1006. In some embodiments, the command may be similar to the command received from remote device 1054. In some embodiments, data analysis platform 1004 may perform additional analysis based on the received command from remote device 1054 before sending a command to control platform 1006. In step 207, control platform 1006 may take corrective action. The corrective action may be based on the command received from data analysis platform 1004, remote device 1054. The corrective action may be include regulating the flow of the supplemental hydrogen gas stream in line 44 and/or the supplemental hydrocarbon stream in line 43 through the inventory lines by adjusting the valve associated with the corresponding inventory lines of the hydrogen gas and the hydrocarbon stream.

Referring back to FIG. 1, the compressed product gas stream in line 47 may be passed to a cold box 50. The cold box 50 typically has a series of cryogenic heat exchangers between process and/or refrigerant streams and the compressed, purified reactor effluent stream followed by separators to remove vapor streams from liquid streams. Most of the hydrogen is recovered as a gaseous stream in a gas line 52 from the cold box 50. The concentration of hydrogen in the gaseous stream in the gas line 52 increases proportionally to the flow rate of hydrogen that is recycled to the reactor 101. Methane and C2+ hydrocarbon concentration of the gaseous stream in the gas line 52 will vary depending on the design and operation of the cold box 50. The gaseous stream in the gas line 52 will be rich in hydrogen typically comprising at least 85 mol %, preferably at least 90 mol % hydrogen, 1 to 8 mol %, preferably 5 mol %, methane and the balance C2+ hydrocarbons and nitrogen. A product liquid stream rich in methane and C2+ hydrocarbons is removed from the cold box in a product liquid line 54.

In an exemplary embodiment, hydrogen may be recovered from the gaseous stream in the gas line 52. A gas stream comprising methane and C2+ hydrocarbons may be obtained after the recovery of hydrogen from the gaseous stream in the gas line 52. The gas stream comprising methane and C2+ hydrocarbons may be used as a fuel gas stream in the catalyst regenerator 160. The product liquid stream in line 54 may be passed to a product recovery section for recovery of product hydrocarbons streams and recycle stream for PDH reactor 101.

SPECIFIC EMBODIMENTS

While the following is described in conjunction with specific embodiments, it will be understood that this description is intended to illustrate and not limit the scope of the preceding description and the appended claims.

A first embodiment of the present disclosure is a start-up method for contacting a feed stream with fluidized catalyst comprising reacting a feed stream over a catalyst to produce a gas stream and spent catalyst; separating the gas stream from the spent catalyst; passing the gas stream to a compressor; measuring operating condition associated with the compressor; and providing one or both of a supplemental hydrocarbon stream and a supplemental hydrogen gas stream to the compressor based on a measured operating condition associated with the compressor to meet a predetermined operating condition associated with the compressor. An embodiment of the present disclosure is one, any or all of prior embodiments in this paragraph up through the first embodiment in this paragraph further comprising regulating a flow rate of one or both of the supplemental hydrocarbon stream and the supplemental hydrogen gas stream to the compressor. An embodiment of the present disclosure is one, any or all of prior embodiments in this paragraph up through the first embodiment in this paragraph wherein the predetermined operating condition associated with the compressor is a predetermined operating condition associated with a steady-state operation of the compressor. An embodiment of the present disclosure is one, any or all of prior embodiments in this paragraph up through the first embodiment in this paragraph wherein the operating condition associated with the compressor comprises hydraulic pressures, an inlet gas temperature, a compressor rotation speed, or an average molecular weight of the gas stream. An embodiment of the present disclosure is one, any or all of prior embodiments in this paragraph up through the first embodiment in this paragraph wherein regulating one or both of the supplemental hydrocarbon stream and the supplemental hydrogen gas stream to the compressor comprises receiving sensor data comprising the operating condition associated with the compressor from one or more sensors associated with the compressor; comparing the sensor data comprising the operating condition associated with the compressor with a predetermined operating condition associated with the compressor; determining the flow rate for one or both of the supplemental hydrocarbon stream and the supplemental hydrogen gas stream to the compressor based on comparing the sensor data comprising the operating condition associated with the compressor with the predetermined operating condition associated with the compressor; and sending a command configured to cause an adjustment to the flow rate of one or both of the supplemental hydrocarbon stream and the supplemental hydrogen gas stream to the compressor by causing adjustment to one or more valves associated with the supplemental hydrocarbon stream and the supplemental hydrogen gas stream. An embodiment of the present disclosure is one, any or all of prior embodiments in this paragraph up through the first embodiment in this paragraph, wherein the step of sending the command causes an adjustment to a composition of the gas stream entering the compressor by the adjustment to one or more valves associated with the supplemental hydrocarbon stream and the supplemental hydrogen gas stream. An embodiment of the present disclosure is one, any or all of prior embodiments in this paragraph up through the first embodiment in this paragraph, wherein the one or more sensors associated with the compressor comprises pressure sensors. An embodiment of the present disclosure is one, any or all of prior embodiments in this paragraph up through the first embodiment in this paragraph wherein the step of measuring operating condition associated with the compressor comprises measuring an average molecular weight of the gas stream. An embodiment of the present disclosure is one, any or all of prior embodiments in this paragraph up through the first embodiment in this paragraph wherein the compressor is a dynamic compressor. An embodiment of the present disclosure is one, any or all of prior embodiments in this paragraph up through the first embodiment in this paragraph further comprising reducing the flow rate of one or both of the supplemental hydrocarbon stream and the supplemental hydrogen gas stream to the compressor after the process reaches steady state operation. An embodiment of the present disclosure is one, any or all of prior embodiments in this paragraph up through the first embodiment in this paragraph wherein the hydrocarbon stream is selected from one or both of a propane stream and an isobutane stream. An embodiment of the present disclosure is one, any or all of prior embodiments in this paragraph up through the first embodiment in this paragraph wherein the feed stream has a greater average molecular weight than the gas stream. An embodiment of the present disclosure is one, any or all of prior embodiments in this paragraph up through the first embodiment in this paragraph wherein the feed stream comprises a sulfiding agent. An embodiment of the present disclosure is one, any or all of prior embodiments in this paragraph up through the first embodiment in this paragraph, further comprising sending an alert to a remote device, the alert comprising the measured operating condition of the compressor.

A second embodiment of the present disclosure is a start-up method for contacting a feed stream with fluidized catalyst comprising reacting a feed over a catalyst to produce a gas stream and spent catalyst; separating the gas stream from the spent catalyst; passing the gas stream to a compressor; and providing one or both of a supplemental hydrocarbon stream and a supplemental hydrogen gas stream to the compressor based on a measured operating condition from one or more sensors associated with the compressor to meet a predetermined operating condition associated with the compressor; regulating a flow rate of one or both of the supplemental hydrocarbon stream and the supplemental hydrogen gas stream to the compressor by a data analysis platform, the data analysis platform comprises one or more processors, memory, and a communication interface in communication with the one or more sensors associated with the compressor. An embodiment of the present disclosure is one, any or all of prior embodiments in this paragraph up through the second embodiment in this paragraph wherein the step of regulating the flow rate of one or both of the hydrocarbon stream and the hydrogen gas stream to the compressor comprising receiving sensor data comprising operating condition associated with the compressor from the one or more sensors associated with the compressor; comparing the sensor data comprising the operating condition associated with the compressor with the predetermined operating condition associated with the compressor; determining the flow rate for one or both of the supplemental hydrocarbon stream and the supplemental hydrogen gas stream to the compressor based on comparing the sensor data comprising the operating condition associated with the compressor with the predetermined operating condition associated with the compressor; and sending a command configured to cause an adjustment to the flow rate of one or both of the supplemental hydrocarbon stream and the supplemental hydrogen gas stream to the compressor by causing adjustment to one or more valves associated with the hydrocarbon stream and the hydrogen gas stream. An embodiment of the present disclosure is one, any or all of prior embodiments in this paragraph up through the second embodiment in this paragraph, wherein the operating condition associated with the compressor comprises hydraulic pressure, an inlet gas temperature, a compressor rotation speed, or an average molecular weight of the gas stream. An embodiment of the present disclosure is one, any or all of prior embodiments in this paragraph up through the second embodiment in this paragraph, wherein the predetermined operating condition associated with the compressor is a predetermined operating condition associated with a steady-state operation. An embodiment of the present disclosure is one, any or all of prior embodiments in this paragraph up through the second embodiment in this paragraph, wherein the step of sending the command causes an adjustment to a composition of the gas stream entering the compressor by the adjustment to one or more valves associated with the supplemental hydrocarbon stream and the supplemental hydrogen gas stream. An embodiment of the present disclosure is one, any or all of prior embodiments in this paragraph up through the second embodiment in this paragraph wherein the compressor is a dynamic compressor.

A third embodiment of the present disclosure is a start-up method for contacting a feed stream with fluidized catalyst comprising reacting a feed over a catalyst to produce a gas stream and spent catalyst; separating the gas stream from the spent catalyst; passing the gas stream to a compressor; providing one or both of a supplemental hydrocarbon stream and a supplemental hydrogen gas stream to the compressor based on a measured operating condition associated with the compressor comprising hydraulic pressure, an inlet gas temperature, a compressor rotation speed, or an average molecular weight of the gas stream at a suction side of the compressor; and regulating a flow rate of one or both of the supplemental hydrocarbon stream and the supplemental hydrogen gas stream to the compressor to meet a predetermined operating condition of the compressor associated with a steady-state operation.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A start-up method for contacting a feed stream with fluidized catalyst comprising:
   reacting a feed stream over a catalyst to produce a gas stream and spent catalyst;
   separating said gas stream from said spent catalyst;
   passing the gas stream to a compressor;
   measuring an operating condition associated with the compressor;
   providing one or both of a supplemental hydrocarbon stream and a supplemental hydrogen gas stream to the compressor based the measured operating condition associated with the compressor to meet a predetermined operating condition associated with the compressor, and
   regulating a flow rate of one or both of the supplemental hydrocarbon stream and the supplemental hydrogen gas stream to the compressor by sending a command configured to cause an adjustment to one or more valves associated with the supplemental hydrocarbon stream and the supplemental hydrogen gas stream, wherein the adjustment to one or more valves associated with the supplemental hydrocarbon stream and the supplemental hydrogen gas stream causes an adjustment to a composition of the gas stream entering the compressor.

2. The method of claim 1 wherein the predetermined operating condition associated with the compressor is a predetermined operating condition associated with a steady-state operation of the compressor.

3. The method of claim 1 wherein the operating condition associated with the compressor comprises hydraulic pressure, an inlet gas temperature, a compressor rotation speed, or an average molecular weight of the gas stream.

4. The method of claim 1 wherein regulating one or both of the supplemental hydrocarbon stream and the supplemental hydrogen gas stream to the compressor further comprises:
   receiving sensor data comprising the operating condition associated with the compressor from one or more sensors associated with the compressor;
   comparing the sensor data comprising the operating condition associated with the compressor with a predetermined operating condition associated with the compressor; and
   determining the flow rate for one or both of the supplemental hydrocarbon stream and the supplemental hydrogen gas stream to the compressor based on comparing the sensor data comprising the operating condition associated with the compressor with the predetermined operating condition associated with the compressor.

5. The method of claim 4, wherein the one or more sensors associated with the compressor comprises pressure sensors.

6. The method of claim 1 wherein the step of measuring operating condition associated with the compressor comprises measuring an average molecular weight of the gas stream.

7. The method of claim 1 wherein the compressor is a dynamic compressor.

8. The method of claim 1 further comprising reducing the flow rate of one or both of the supplemental hydrocarbon stream and the supplemental hydrogen gas stream to the compressor after the process reaches steady state operation.

9. The method of claim 1 wherein the hydrocarbon stream is selected from one or both of a propane stream and an isobutane stream.

10. The method of claim 1 wherein the feed stream comprises a sulfiding agent.

11. The method of claim 1, further comprising:
   sending an alert to a remote device, the alert comprising the measured operating condition of the compressor.

12. A start-up method for contacting a feed stream with fluidized catalyst comprising:
   reacting a feed over a catalyst to produce a gas stream and spent catalyst;
   separating said gas stream from said spent catalyst;
   passing the gas stream to a compressor;

providing one or both of a supplemental hydrocarbon stream and a supplemental hydrogen gas stream to the compressor based on a measured operating condition from one or more sensors associated with the compressor to meet a predetermined operating condition associated with the compressor; and regulating a flow rate of one or both of the supplemental hydrocarbon stream and the supplemental hydrogen gas stream to the compressor by a data analysis platform, the data analysis platform comprises one or more processors, memory, and a communication interface in communication with the one or more sensors associated with the compressor, wherein the flow rate of one or both of the supplemental hydrocarbon stream and the supplemental hydrogen gas stream to the compressor is regulated by sending a command configured to cause an adjustment to one or more valves associated with the supplemental hydrocarbon stream and the supplemental hydrogen gas stream, wherein the adjustment to one or more valves associated with the supplemental hydrocarbon stream and the supplemental hydrogen gas stream causes an adjustment to a composition of the gas stream entering the compressor.

13. The method of claim 12 wherein the step of regulating the flow rate of one or both of the hydrocarbon stream and the hydrogen gas stream to the compressor further comprising:

receiving sensor data comprising operating condition associated with the compressor from the one or more sensors associated with the compressor;

comparing the sensor data comprising the operating condition associated with the compressor with the predetermined operating condition associated with the compressor; and determining the flow rate for one or both of the supplemental hydrocarbon stream and the supplemental hydrogen gas stream to the compressor based on comparing the sensor data comprising the operating condition associated with the compressor with the predetermined operating condition associated with the compressor.

14. The method of claim 12, wherein the operating condition associated with the compressor comprises hydraulic pressure, an inlet gas temperature, a compressor rotation speed, or an average molecular weight of the gas stream.

15. The method of claim 12, wherein the predetermined operating condition associated with the compressor is a predetermined operating condition associated with a steady-state operation.

16. The method of claim 12 wherein the compressor is a dynamic compressor.

17. A start-up method for contacting a feed stream with fluidized catalyst comprising:

reacting a feed over a catalyst to produce a gas stream and spent catalyst;

separating said gas stream from said spent catalyst;

passing the gas stream to a compressor;

providing one or both of a supplemental hydrocarbon stream and a supplemental hydrogen gas stream to the compressor based on a measured operating condition associated with the compressor comprising hydraulic pressure, an inlet gas temperature, a compressor rotation speed, or an average molecular weight of the gas stream at a suction side of the compressor; and regulating a flow rate of one or both of the supplemental hydrocarbon stream and the supplemental hydrogen gas stream to the compressor to meet a predetermined operating condition of the compressor associated with a steady-state operation, wherein the flow rate of one or both of the supplemental hydrocarbon stream and the supplemental hydrogen gas stream to the compressor is regulated by sending a command configured to cause an adjustment to one or more valves associated with the supplemental hydrocarbon stream and the supplemental hydrogen gas stream, wherein the adjustment to one or more valves associated with the supplemental hydrocarbon stream and the supplemental hydrogen gas stream causes an adjustment to a composition of the gas stream entering the compressor.

* * * * *